United States Patent Office 2,711,273
Patented June 21, 1955

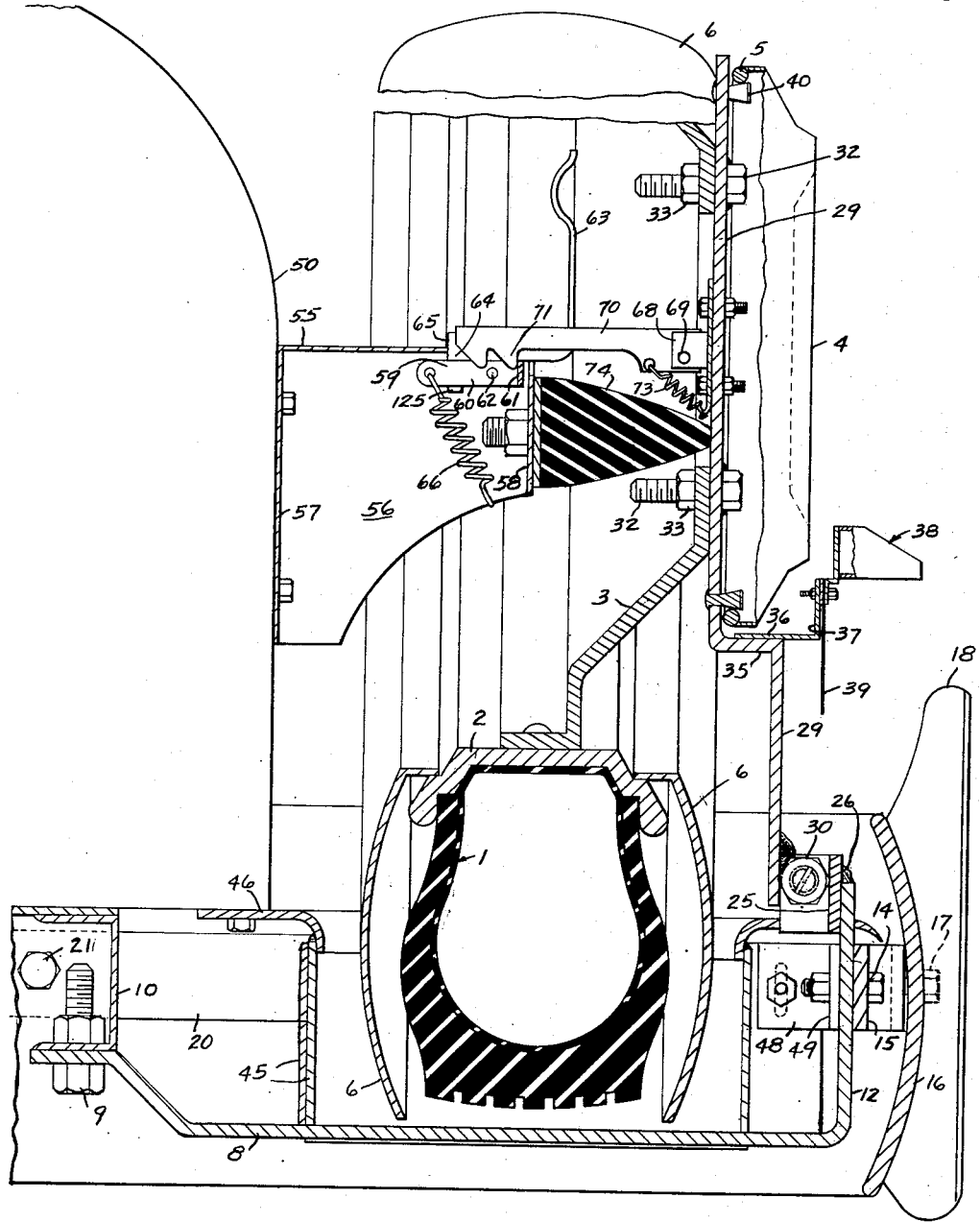
Fig.1-

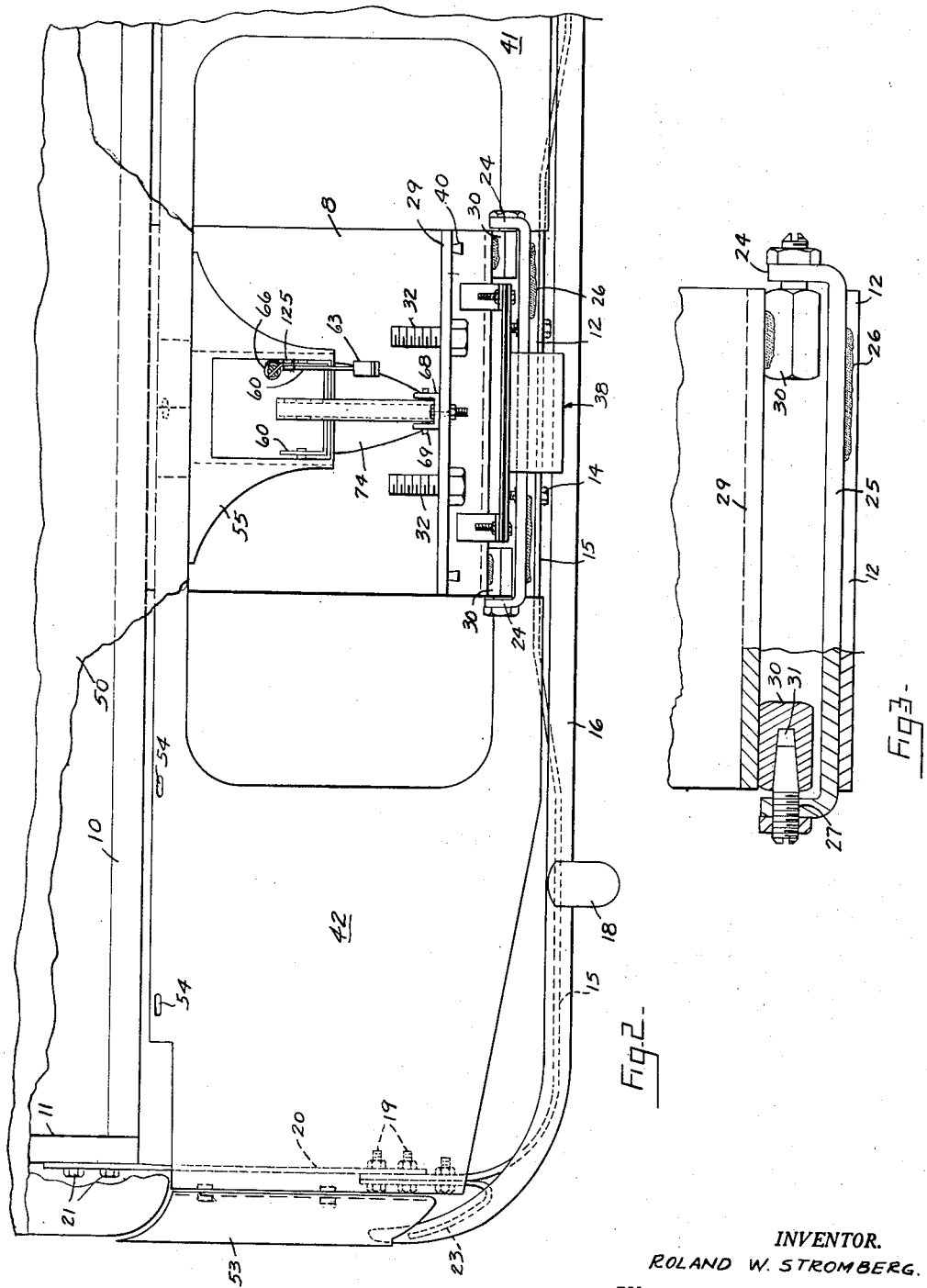

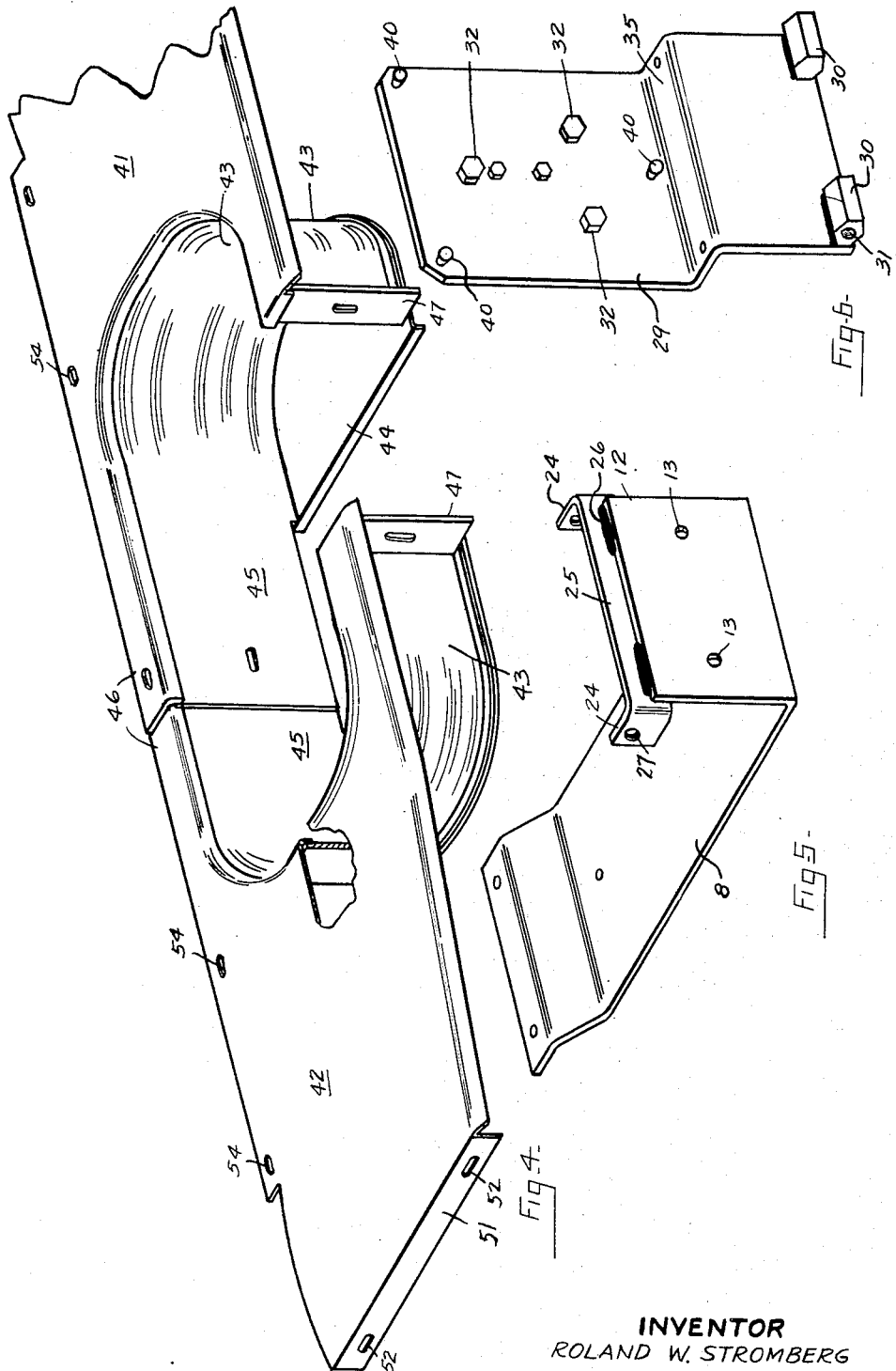

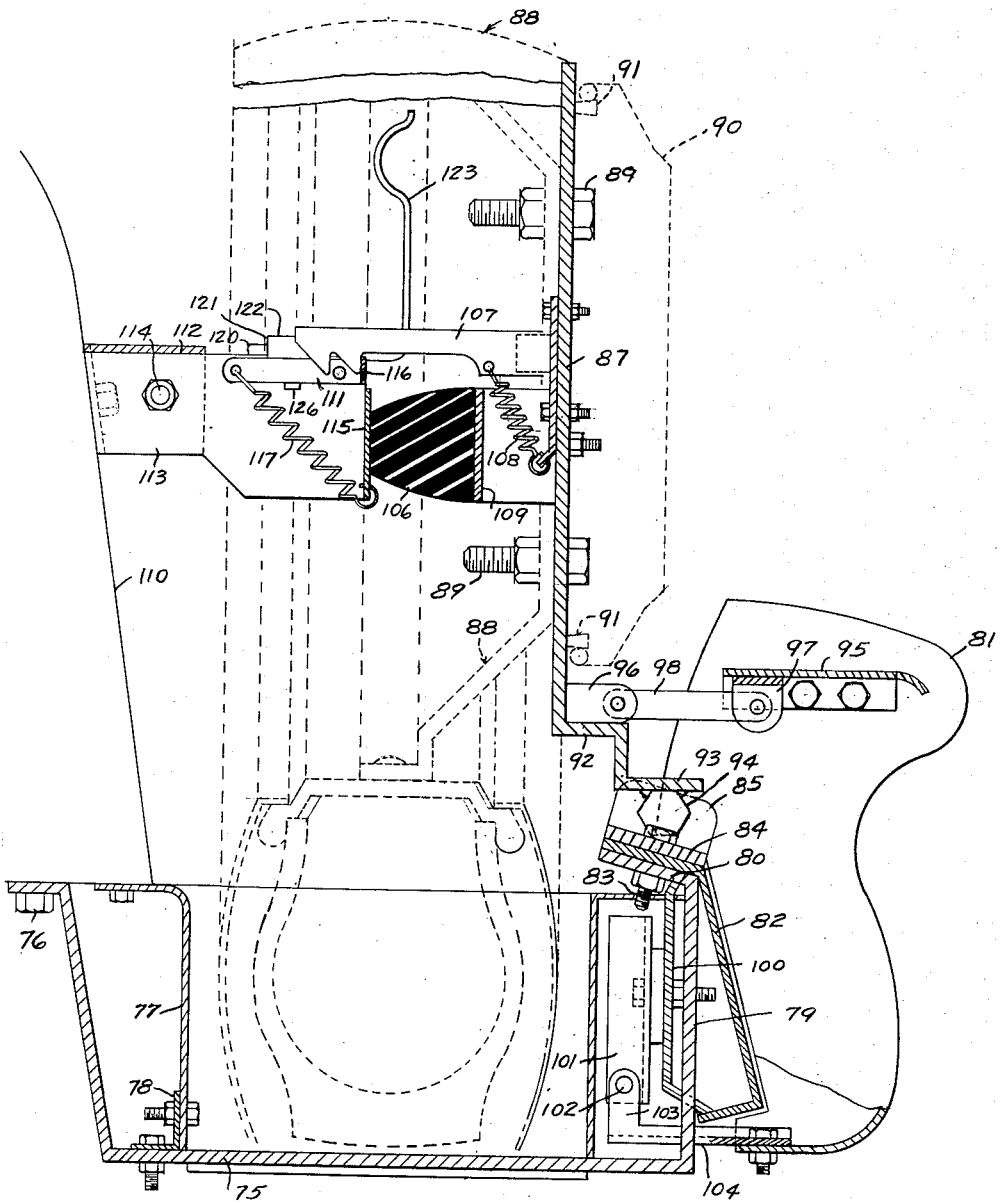

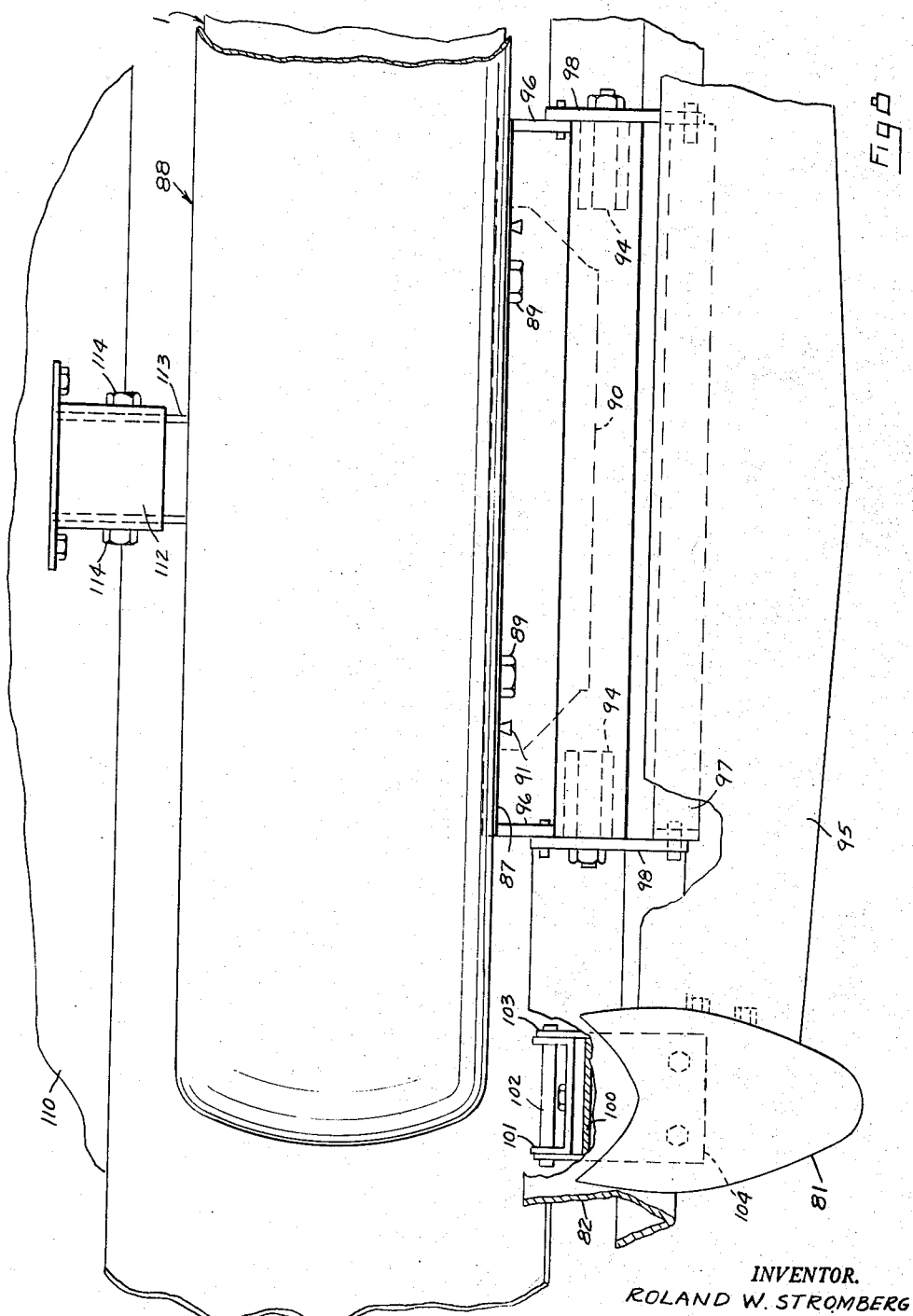

2,711,273

SPARE WHEEL ASSEMBLY SUPPORT FOR REAR END OF AUTOMOBILE

Roland W. Stromberg, San Francisco, Calif., assignor, by mesne assignments, to Hudelson-Whitebone Corporation, San Francisco, Calif., a corporation of California Application May 19, 1951, Serial No. 227,133

6 Claims. (Cl. 224—42.06)

This invention relates to a support for supporting a spare wheel assembly on the rear end of an automobile, and said support is generally of the same type as shown in my Patent No. 2,553,686, dated May 22, 1951.

By "wheel assembly" is meant the tire, rim, wheel and in some instances, the hub cap.

One of the objects of the invention is the provision of an improved support for a wheel adapted to be secured on the rear end of an automobile for supporting the wheel at said rear end with the hub cap independent of the wheel but in proper position relative to said wheel disposed over the central opening in the latter, whereby the wheel assembly, exclusively of the hub cap can be quickly removed for use and replaced by another wheel without the necessity of removing the hub cap from the support.

Another object of the invention is the provision of a support that is simplified over prior structure and that provides a more rigid support for the wheel assembly.

A still further object of the invention is the provision of a rear end support for a wheel assembly that is adapted to be more readily and accurately secured in position than heretofore.

An added object of the invention is the provision of a wheel assembly support for the rear end of an automobile that is so constructed as to facilitate the swinging of the assembly from vertical to horizontal position and vice versa, and a still further object is the provision of a swingable wheel assembly support that includes improved means for releasably holding it in a position for supporting a wheel assembly in vertical position.

Another object is the provision of an improved support for a wheel assembly in which there is a gravel guard or shield having a central well that has a bottom separable therefrom, and which bottom constitutes part of the bracket or support that carries the assembly.

Other objects and advantages will appear in the drawings and description.

In the drawings,

Fig. 1 is a vertical sectional view taken through a wheel assembly and support and in position on the rear end of an automobile. The wheel is broken in height and is shown partly in elevation.

Fig. 2 is a reduced size top plan view of part of the support without the wheel assembly, but showing the main portion of the support.

Fig. 3 is a part section, part elevational, enlarged plan view of one of the hinges for the portion of the support to which the wheel assembly is adapted to be secured.

Fig. 4 is an isometric view of part of the gravel shield portion of the invention.

Fig. 5 is an isometric view of part of the bracket or support for the wheel assembly.

Fig. 6 is an isometric view of the portion of the support that is adapted to be directly secured to the wheel, and which portion is also adapted to hold the hub cap independently of the wheel, and Figs. 7, 8 are sectional and plan views of a different form.

In detail, the spare wheel that is adapted to be carried by the present support comprises a tire 1, rim 2, and central portion 3, and the term "wheel" where used generally herein is intended to include these parts. A hub cap 4 is also adapted to be removably secured to the wheel by springing the bead 5 on said cap over suitable projections on the central portion 3 of said wheel.

Where the spare wheel on an automobile is exposed, it is desirable to have a metal shield, such as indicated at 6 substantially covering the portion of the tire that would normally be seen, and heretofore it has also been usual to have the hub cap secured to the central portion 3 of the wheel, to cover the central opening in the latter. In changing a wheel, where the spare wheel has a hub cap thereon, it is necessary to first remove the hub cap that is on the wheel to be replaced and to also remove the hub cap from the spare wheel. After the change, the hub caps must be placed back on both wheels. By the present invention, only the hub cap on the wheel that is on the axle need be removed for the reason that the hub cap for the wheel that is to be the spare will remain on the spare wheel support, but in a position properly extending over the central opening in the wheel. To outward appearances, the hub cap is on the wheel.

To support the spare wheel and to provide for the accomplishment of the above result, as well as to enable swinging the spare tire away from the rear deck or luggage compartment of an automobile, a spare wheel supporting bracket is provided, which bracket comprises a relatively wide generally horizontally disposed metal strip 8 that is adapted to extend longitudinally of the longitudinal axis of the automobile rearwardly thereof (Figs. 1, 3, 5).

In using the terms "rearwardly," and "forwardly" in the description, these are used with reference to the automobile. For example, a part that is described as extending forwardly will extend toward the automobile (the present spare wheel carrier being at the rear end of the automobile and mostly between the bumper and the automobile).

The forward end of strip 8 extends slantingly upwardly (Fig. 1) and may be bolted by bolts 9 to a rear cross frame member 10 on the automobile, which member 10 is secured at its ends to the side frame members 11 of the chassis. The rear end of the strip 8 extends vertically upwardly as at 12 (Figs. 1, 5).

The upward extension 12 of strip 8 is formed with openings 13 (Fig. 5) for bolts 14 (Fig. 1) that are adapted to secure said extension to the central portion of a horizontal cross bar 15 that, in turn, is bolted to and carries the rear bumper 16. This bar 15 may be made in several sections that may be bolted together and to the bumper by the same bolts 17 (Fig. 1) that bolt the bumper guards 18 to the bumper. The ends of the cross bar 15 are turned forwardly (Fig. 2) and bolts 19 secure said forwardly extending ends to the rear ends of strips 20 that in turn are bolted at 21 at their forward ends to the side frame members 11. Said strips 20 virtually constitute rearward extensions of the frame members 11.

This cross bar 15 and strips 20 virtually constitute a horizontally elongated U-frame disposed on its side with the strips or extensions 20 forming the relatively short forwardly projecting legs of the U.

Strips 23 at the ends of the cross bar 15 are secured at one of their ends to each end of the bumper by any suitable means, such as by bolts, rivets or by welding and the opposite ends of said strips are secured to strips 20 by the bolts 19 (Fig. 2).

The U-frame that is made up of the bar 15 and strips 20 supports the bumper, hence is the bumper support, and, as explained, it is also secured to the rear upstanding end 12 of the central strip 8, the latter being part of the wheel supporting bracket.

Said upstanding portion 12 is provided at its upper end with a pair of opposed ears 24 that are adjacent to the opposite ends of the upper edge of portion 12, respectively, and said ears project forwardly from said portion (Figs. 1, 2). As best seen in Fig. 5, said ears 24 constitute the ends of a horizontal metal strip 25 that may be secured by welding 26 to said upstanding end 12 of strip 8, and said ears are formed with horizontally aligned apertures 27.

Disposed between ears 24 is the lower end of an upper bracket plate 29, the strip 8 being the lower bracket member. This plate 29 is provided at its lower end with horizontally aligned bearings 30 (Fig. 3) that are respectively adjacent to ears 24, and said bearings are recessed at 31 (Fig. 6) for taper take-up pivots that are threadedly secured at one of their ends in the apertures in ears 24 and that have tapered ends rotatably fitted in recesses 31. By this structure, the upper bracket plate 29 is hinged to the lower bracket member 8 for swinging of said plate rearwardly to generally horizontally extending position from its upstanding position. Lock nuts on the threaded ends of the taper ended pivots secure them to the ears 24 against rotation relative thereto, and the outer ends of said pivots are slotted for adjustment by a screw driver when the nuts are loosened.

The upper part of plate 29 is offset forwardly (when the plate extends upwardly) and said offset portion is provided with bolts 32 that project forwardly therefrom. These bolts may be welded to plate 29 so as to be rigid therewith. Bolts 32 are so arranged and spaced as to register with correspondingly positioned openings in the central portion 3 of the wheel. Nuts 33 on said bolts 32 are adapted to secure the wheel to plate 29.

By the foregoing structure, it will be apparent that the bracket plate 29 is disposed rearwardly of the wheel when the wheel is secured thereto, and the hinge joint between the plate 29 and the portion 12 of strip 8 is between the wheel and the bumper. The positioning of the axis of rotation of plate 29 spaced rearwardly of the lower edge of plate 29 results in the plate being elevated sufficiently when it is swung rearwardly to generally horizontal extending position to extend across the upper edge of the bumper while the hinge is at a level below said upper edge and substantially concealed by the bumper when the plate 29 and wheel are vertical.

The shoulder 35 (Fig. 1) that is formed in plate 29 to offset the upper portion of said plate forwardly, provides a suitable ledge for welding or otherwise securing the horizontal leg 36 of an angle bracket thereto. The other leg 37 of said bracket is vertical and carries the license plate lamp housing 38 thereto. The same bolts may secure the lamp housing 38 to leg 37 and also the license plate 39 with the latter in the proper position below the housing to be illuminated by the light in the housing. Wiring for such light (not shown) will be concealed behind the plate 29 and may extend downwardly through any suitable opening in strip 8 to below the latter and then forwardly to the conventional light circuit.

Secured to the rear side of the plate 29 above shoulder 35 are several projections 40 having rounded heads over which the bead 5 of the hub cap 4 is adapted to be sprung for securing the hub cap to the plate. Said projections are so positioned relative to bolts 32 that the hub cap will be coaxial with the axis of the wheel carried on plate 27, and said hub cap when so positioned will extend over plate 27 so as to conceal its position between the wheel and hub cap.

The strip 8 forms the bottom of a central well that is formed in a horizontal gravel shield that, in turn, is secured between the bumper and the body of the automobile at the opposite lateral edges of the said strip 8 (Fig. 5). This gravel shield is preferably formed in two sections, one section 41 being the right hand section (Fig. 4) and section 42 being the left hand section.

Each section is provided with a depending U-shaped flange 43 disposed so that the open sides of the U on each section face each other, and bottom walls 44 secured to the lower edges of said flanges close the lower sides of the well at opposite ends thereof, said walls 44 being substantially coplanar with the strip 8 when the latter is between them.

The forward side 45 of each U-flange 43 is longer than the rear side inasmuch as the rear side is open to receive the portion 12 of the wheel supporting bracket, and the rear sides of said flange as well as corresponding extensions 46 overlap each other at said rear side as seen in Fig. 4.

Opposed flanges 47 along the terminating edges of the forward side of the flange 43 are provided with suitable openings for bolting one leg 48 of an angle clip to said flange with the other leg 49 bolted to the portion 12 by each bolt 14.

The gravel shield sections 41, 42 are formed with flanges 51 that are formed with horizontally elongated openings 52 (Fig. 4) for bolts or screws to secure the same to corresponding sections on end pieces 53 (Fig. 2). Horizontally elongated openings 54 along the forward marginal portions of the gravel shield are for screws for securing the same to the floor of the rear deck. The elongation of the bolt and screw enables adjustment of the gravel shield for variations in models, and to provide a snug fit where such variations occur. Different width strips 8 may be used for different models.

Secured to the rear deck lid 50 (Fig. 1) is a small generally box-like housing having an upper wall 55, depending opposed side walls 56, a rear wall 57 (that is bolted to the rear deck lid) and a relatively narrow front wall 58. The upper wall 55 terminates short of the upper edge of the front wall providing an opening in the top side of said housing. The bottom of the latter is open.

A horizontally disposed generally U-shaped latch bar having its opposed legs 60 adjacent to the inner sides of walls 56 respectively is positioned just below the opening at the rear end of the upper wall 55. Legs 60 extend horizontally from the closed end 61 of the U, and coaxial horizontal pivots 62 secure legs 60 to the walls 56 at points spaced between the ends of the legs 60.

Secured to one of said legs 60 is an upstanding handle 63 that may be in the form of a strip secured at its lower end along the upper edge of said leg 60 (Fig. 1) as at 64 so as to provide a rearwardly facing shoulder 65 that extends across and substantially in engagement with the front edge of top wall 55. The strip forming said handle extends rearwardly of the leg 60 for a short distance and then upwardly so that the upstanding part 63 can be pressed rearwardly by the fingers of a hand to swing the closed end 61 of the latch bar downwardly. A spring 66 connects the forward end of one of the legs 60 (preferably the one with handle 63 secured thereto) with the wall 56 adjacent thereto for tending to move the latch bar 61 upwardly at all times. The engagement between shoulder 65 and wall 55 will prevent the bar 61 from swinging upwardly above the level of the upper wall 55.

The forward side of plate 29 at the point where said plate extends across the central opening in the portion 3 of the wheel has a clevis 68 secured thereto, the sides of which are apertured for a horizontal pivot 69 that extends through the opposed sides of an inverted channel member 70 at one end of the latter for pivoting said member 70 for vertical swinging of its forward end.

The member 70 constitutes a latch, and the lower edges of the sides at its forward end are notched to provide a plurality of downwardly projecting ratchet teeth 71 having forwardly and upwardly inclined forward sides.

The end edges of the sides of said channel latch member 70 engage the base of clevis 68 to prevent the forward toothed end from swinging downwardly past a position in which the inclined forward sides of the teeth will not engage the latch bar 61 when the plate 29 carrying the latch 70 is moved rearwardly. The said clevis is so positioned and arranged that it will support the latch 70 in a position so the teeth 71 will successively be lifted and moved over said latch bar 61 when said plate 29 is swung rearwardly, and a spring 73 secured to said bar 70 and to plate 29 by any suitable means tends to yieldably hold the member 70 downwardly at all times to the limit of its downward movement.

Secured to the wall 58 is a generally frusto-conical block of rubber or yieldable material 74 that is adapted to form a yieldable stop for the movement of the wheel to vertical position. This enables the ratchet teeth to hold the wheel rigid with the rubber 74 under sufficient compression to prevent the wheel from rattling or becoming loose.

In operation, assuming the wheel is in position on the bracket at the rear of the automobile, and the operator wishes to gain entry to the luggage compartment, the latch handle is swung rearwardly, moving the latch bar 61 downwardly to release it from the teeth 71. The tire will not swing rearwardly until moved inasmuch as the hinge about which it swings is rearwardly of the center of gravity of the wheel. However, when the wheel is swung rearwardly it will move from an angle of about 45° relative to vertical to generally horizontally extending position according to the model of the automobile, and access to the rear deck is easily had.

When the spare wheel is to be changed, by removing it for use and replacing with another wheel, the operator may swing the wheel rearwardly to generally horizontally extending position so that access to the nuts 33 is had, and said nuts are then removed and the wheel taken off. The hub cap on the wheel to supplant the spare wheel has already been removed in order to remove it from the axle, so said wheel is placed on the spare tire carrier and nuts 33 replaced and the carrier swung up, without disturbing the hub cap 4. There is no more handling of hub caps than in an ordinary wheel or tire change.

In some installations, the bumper guards are so close together that a spare wheel positioned between the bumper and automobile as low in position as seen in Fig. 1 would not be capable of clearing the bumper. The structure shown in Figs. 7, 8 illustrates such a condition, in Fig. 7 the wheel being shown in dash lines only, instead of in full line and in section, and in Fig. 8 the wheel is seen in full line.

In the modification as shown in Figs. 7, 8, the gravel shield or guard is substantially the same as in Figs. 1, 2 in that it is formed to provide a central well and a bracket support for the wheel forms the central section for the well.

This bracket support comprises a relatively wide metal strip 75 this is horizontal where it forms a bottom portion of the gravel shield, and extends upwardly at its forward end for securement to the automobile by bolts 76. The forward side 77 of the well in the gravel shield may be secured at its lower edge to the strip 75 by an angle clip 78 one leg of which is bolted to the strip and the other leg is bolted to said forward side.

The rear end of strip 75 extends upwardly as at 79 and the upper end portion 80 of the part 79 is inclined forwardly and upwardly spaced between the bumper guards and terminates at a level spaced substantially below the upper level of the upper ends of the bumper guards 81 and below and against the upper and forwardly extending marginal portion of the bumper 82 to which said portion 80 is secured by bolts 83.

Bolts 83 extend through said upper marginal portion of the bumper and also through a strip 84 that is on the upper side of said portion extending longitudinally thereof.

Strip 84 has upturned coaxially apertured ears 85 at its ends, which strip corresponds generally to strip 25 of Figs. 1, 3 in that it is one element of a hinge between the upper bracket portion that carries the wheel and the lower bracket portion, or strip 75.

The upper bracket portion comprises bracket plate 87 to which the wheel 88 (indicated in dash lines) is adapted to be secured in exactly the same manner as in Fig. 1, by bolts 89, and the hub cap 90 (also indicated in dotted line) is secured to the rear side of plate 87 on projections 91 exactly as shown in Fig. 1.

The lower marginal portion of plate 87 is formed with two rearwardly offset portions, the first providing an upper horizontal shoulder 92 and the second and lower shoulder 93, the latter being offset rearwardly farther than the upper shoulder.

The lower shoulder carries a pair of spaced bearing members 94 between and respectively adjacent to the ears 85, which bearing members are identical with bearing members 30 of Fig. 3 and they receive taper take up pivots, the same in every respect as those shown in Fig. 3 including lock nuts and means for taking up the pivots.

The bumper guards 81 are not secured to the bumper, but are carried by the wheel supporting bracket structure and bumper.

The bumper guards are secured together by a horizontal strip 95 that is connected at its ends to the guards adjacent to their upper ends and well above the bumper. The upper wheel supporting bracket plate 87 is provided with a pair of coaxially apertured ears 96 just above the upper shoulder 92, and secured to the underside of strip 95 is a correspondingly positioned set of coaxially apertured ears 97. Parallel horizontally extending links 98 are pivotally connected at their ends with ears 96, 97. This structure provides the connection between the upper bracket plate 87 and the bumper guards.

Secured within the forwardly opening side of the bumper (the latter being generally channel shaped in transverse contour) are a pair of plates 100 that are positioned opposite the bumper guards, hence are more widely spaced apart than links 98.

Plates 100 are bent rearwardly at their upper and lower ends to engage the bumper in a manner for positioning the central portion of each plate vertically (Fig. 7) and so that the plane of said central portion is spaced forwardly of the lower edge of the bumper.

The plates 100 are preferably secured to the bumper by welding, but may be secured to them in any suitable manner.

Bolted to the rear side of each plate 100 is a vertically extending channel strip 101 having its open side directed forwardly. A horizontal pivot 102 extends through the sides of said channel strip at its lower end and the ends of each pivot 102 extend through upstanding ears 103 that are at the opposite outer sides of said lower end and which ears are on the forward end of a link 104. Each link 104 extends rearwardly below the bumper 82 and into the lower end of one of the bumper guards 81 to which it is rigidly bolted. This structure provides the means for securing the lower ends of the bumper guards to the bumper and through the bumper to the lower bracket plate 79 that in turn is secured to the bumper.

By the above structure, the bumper guards will move rearwardly and downwardly when the wheel is swung rearwardly and downwardly about the hinge between the upper and lower bracket plates 87, 79 so there will be no interference between the wheel and said bumper guards. The guards will automatically swing back to position extending across the bumper when the wheel is swung back to vertical position.

The latch mechanism in the form shown in Fig. 7 is different from that shown in Fig. 1 principally in that the rubber bumper block 106 is carried on the plate 87 below the latch 107 that corresponds to latch 70 of Fig. 1 and that is secured to the plate 87 in the same manner as latch 70 is secured to plate 29. A spring 108 pulls the latch 107 downwardly. The bumper block 106 is secured to the base 109 of a horizontally disposed U-strip the legs of which are secured at their ends to plate 87 and spring 108 extends from latch to between said legs.

Secured to the rear deck lid 110 of the automobile is a rearwardly projecting inverted channel section having a top wall 112 and opposed vertical side walls. Telescopically extending into the rear open end of said channel section and between the sides of the latter is a horizontally disposed U-member, legs 113 of which extend horizontally into said channel section adjacent to the sides of the latter, and said legs are secured to said sides by bolts 114.

The closed rear end 115 of said U-member is adapted to be engaged by the bumper block 106 when the wheel is vertical.

A horizontally disposed U-shaped latch bar that is identical with latch bar 59 of Fig. 1 has its legs 111 alongside the legs 113 of said U-member with its closed end 116 positioned adjacent to the rear wall 115 that is below said end 116. This closed end 116 of the latch bar is adapted to be engaged by the teeth of the latch 107 in exactly the same manner as teeth 71 of latch 70 engage the closed end 61 of the latch bar of Fig. 1. A spring 117 is connected with the forward end of one of the legs 111 and with the lower edge of the wall 115 for yieldably engaging the closed end 116 of the latch upwardly, and a stop 120 may extend from the side of the U-member carrying said latch bar over the upper edge of the latter and behind the shoulder 121 of the handle strip 122 to prevent the latch bar 116 from swinging too far upwardly for engagement by the teeth of latch 107 when the wheel is swung to vertical position.

The strip 122 has an upstanding handle 123 that is adapted to function in exactly the same manner as the handle 63 of Fig. 1.

It is believed that the operation of the wheel support is clear from the description. The principal differences between the two forms shown being that in the form shown in Figs. 7, 8 the bumper guards swing with the spare wheel, so as not to interfere with the latter while permitting the spare wheel to swing back and forth from a horizontal extending position over the bumper to a vertical position between the bumper and the rear deck of the automobile. Also the rubber bumper block 106 is on the wheel supporting bracket instead of being on the rear deck.

In both forms of the invention, the wheel supporting bracket is directly connected to the rearwardly facing side of the wheel and its hinge is between the wheel and the bumper or adjacent to the upper edge of the bumper. Also in both forms of the invention, one portion of the wheel bracket (lower portions) preferably extends below the wheel and forms the bottom of the gravel shield, although it is obvious that the bumper could hingedly support the upper bracket plate under certain conditions. Therefore, the present invention is intended to include such an arrangement.

In Fig. 1 it is to be noted that a stop element 125 on wall 56 of the housing that is to be secured to the deck lid may extend below leg 60 of the latch bar to prevent further downward movement of the forward end of the leg, and a similar element 126 in Fig. 7 may also be provided.

It is to be understood that the word "vertically" as used in the description and claims for describing the position in which the spare tire is adapted to be supported, is not intended to be restrictive to an exactly vertical position, but is intended to cover any generally vertical position. In some instances the wheel is inclined forwardly to blend with the existing lines or contours of the automobile, but in each instance the structure is the same mechanically.

I claim:

1. A spare wheel assembly for supporting a spare wheel vertically on an automobile having a body and a stationary rear bumper between said bumper with said wheel in a position and said body comprising; an upstanding bracket member adapted to be positioned alongside the rear side of such wheel relative to said body, means for securing the central portion of such wheel to the upper end of said bracket member, pivotally connected hinge elements at the lower end of said bracket member disposed above the lowermost side of such wheel and adjacent to said bumper, means for securing said hinge elements to said body and for supporting said hinge elements adjacent to said bumper for swinging said bracket member relative to said bumper to a generally horizontally extending position over said bumper with the said wheel in a similar position above said bracket member and bumper when said wheel is secured on the upper end of said bracket member, a pair of releasably connecting latch elements, means for securing one of said latch elements to said bracket member in a position extending through the center of such wheel when the latter is secured to said member and means for securing the other of said latch elements to the rear end of such body in a position for releasably engaging said one latch element when said bracket member is upstanding with said wheel therein, one of said elements being a vertically swingable latch bar and the other of said elements being a latch having ratchet teeth adapted to successively engage said latch bar when said bracket member is moved to vertically extending position, and a handle connected with said latch bar for manually moving it out of engagement with the teeth of said latch.

2. A spare wheel assembly for supporting a spare wheel vertically at the rear end of the body of an automobile having a rear bumper between said rear bumper and said body comprising; an upstanding bracket member, means for securing the upper end of said member to the rear side of said wheel relative to said body, a lower bracket piece adapted to extend from said body to the lower end of said bracket member, means for securing one end of said bracket piece to said body and means for hingedly securing the opposite end of said piece to said lower end of said bracket plate at a point adjacent to the upper edge of said bumper for swinging said member with a wheel thereon rearwardly and downwardly to a position extending across said bumper with said wheel above said member, horizontally extending gravel shield sections positioned to extend between said body and bumper from the ends of the latter to said lower bracket piece including portions of said shield sections in telescopic slidable relationship for extending said sections oppositely outwardly different distances, and means for securing said sections in said different degrees of extension.

3. In an automobile having a body, a rear bumper stationarily secured to said body spaced rearwardly of the latter and a vertically disposed wheel having its lower portion disposed between said bumper and said body, an upstanding bracket member alongside the rear side of said wheel that faces away from said body, means for securing the central portion of said wheel to the upper end of said member, pivotally connected hinge elements at the lower end of said member above the lowermost side of said wheel and between said wheel and said bumper respectively secured to said member and to said bumper for swinging said bracket relative to said bumper to a position extending transversely across the said bumper with said wheel in a similar position above said bracket member.

4. In an automobile having a body, a rear bumper spaced rearwardly of said body, and a vertically disposed wheel having its lower portion disposed between said bumper and said body; an upstanding bracket member positioned alongside the rear side of said wheel relative to said body, means for securing the central portion of said wheel to the upper end of said member, a lower bracket piece extending below said wheel securing said bumper rigid with said body, means for pivotally connecting the lower end of said bracket member to said lower bracket piece at a point between said wheel and said bumper and below the uppermost side of said bumper for swinging said wheel and said bracket member as a unit to a position extending transversely across said uppermost side.

5. In an automobile having a body, a rear bumper stationarily secured to said body spaced rearwardly of the latter, a vertically disposed wheel having its lower portion disposed between said bumper and said body; an upstanding bracket member secured at its upper end to the central portion of said wheel, means for rigidly securing said bumper to said body including pivot means carried thereby pivotally supporting said member at its lower end for swinging of said member and said wheel relative to said bumper to a position extending transversely across the bumper, bumper guards, means for securing said bumper guards to said member in positions extending across the rear sides of said bumpers when said member extends generally vertically and for movement with said member rearwardly and downwardly away from said bumper upon said member being swung to a position extending transversely across said bumper.

6. In an automobile having a body, a rear bumper and a spare wheel; means for securing said bumper rigid with said body, bumper supporting means for pivotally supporting the lower end of said bracket member to said bumper supporting means and bumper for swinging said member relative to said bumper from a position extending upwardly from said bumper to a position extending transversely across the upper side of said bumper, a hub cap for said wheel, separate means on the upper end of said bracket member for respectively securing said wheel thereto at one side of said member and for releasably securing said hub cap to the upper end of said member at the side opposite to said wheel and in a position coaxial with the wheel to simulate the appearance of securement of said hub cap to said wheel but enabling said wheel to be separated from said member independently of said hub cap.

References Cited in the file of this patent

UNITED STATES PATENTS

| 1,689,148 | McCloud | Oct. 23, 1928 |
| 1,689,149 | McCloud | Oct. 23, 1928 |
| 1,800,309 | McCloud | Apr. 14, 1931 |
| 2,117,049 | Widman et al. | May 10, 1938 |
| 2,189,407 | Rueppel | Feb. 6, 1940 |

FOREIGN PATENTS

| 653,258 | France | Nov. 8, 1928 |
| 304,868 | Italy | Jan. 20, 1933 |